United States Patent [19]

Hiroshima

[11] Patent Number: 5,251,223
[45] Date of Patent: Oct. 5, 1993

[54] AIR-COOLED ARGON ION LASER TUBE

[75] Inventor: Masaaki Hiroshima, Tokyo, Japan

[73] Assignee: NEC Corporation, Tokyo, Japan

[21] Appl. No.: 935,435

[22] Filed: Aug. 26, 1992

[30] Foreign Application Priority Data

Aug. 27, 1991 [JP] Japan .................. 3-214904

[51] Int. Cl.5 .............................................. H01S 3/04
[52] U.S. Cl. ............................................ 372/34; 372/61
[58] Field of Search .................... 372/34, 61, 87, 65

[56] References Cited

U.S. PATENT DOCUMENTS

| 4,756,001 | 7/1988 | Heynisch et al. | 372/61 |
| 4,912,719 | 3/1990 | Kanamoto et al. | 372/34; 372/61 |
| 5,050,184 | 9/1991 | Nelson | 372/34 |

FOREIGN PATENT DOCUMENTS

| 0037679 | 2/1988 | Japan | 372/34 |
| 0139886 | 5/1992 | Japan | 372/34 |

Primary Examiner—Georgia Y. Epps
Attorney, Agent, or Firm—Burns, Doane, Swecker & Mathis

[57] ABSTRACT

There is prevented mirrors from being misaligned owing to a thermal expansion difference caused by temperature distribution along constituent portions of an argon ion laser supporting the mirrors to improve the stability of a laser output. For this purpose, a member having a thermal expansion coefficient to cancel a thermal expansion difference is joined with any of portions of the cathode bulb supporting the mirrors both constituting an optical resonator, said portions demonstrating a temperature difference.

6 Claims, 2 Drawing Sheets

AIR-COOLED ARGON ION LASER TUBE

BACKGROUND OF THE INVENTION

1. Field of the Invention

The present invention relates to an argon ion laser tube, and more particularly to an argon ion laser tube in which misalignment of constituent mirrors caused upon the tube being energized and disenergized is reduced and hence an output characteristic is stabilized.

2. Description of the Prior Art

A prior art argon ion laser tube comprises, as illustrated in FIG. 1, an anode 1 and a hot cathode 2 both serving as electrical discharge electrodes, a laser tube 3 for exciting laser medium argon molecules, a heat radiating plate 4 for radiating much heat produced in the laser tube 3, a cathode bulb 5 serving as an enclosure for enclosing the hot cathode 2 and also serving as a supporter for a gas tank and a total reflection mirror 6b, a semitransparent mirror 6a and a total reflection mirror 6b both constituting an optical resonator, a hot cathode introduction bar 20 serving to supply power to the hot cathode 2 and to connect an electrical discharge current to the outside, and an insulator 21 for electrically insulating the hot cathode introduction bar 20 and the cathode bulb 5. The argon ion laser tube is mounted on a laser oscillator in the same manner as an argon ion laser tube of an embodiment of the present invention illustrated in FIG. 2.

Operation of the prior art argon ion laser tube is as follows.

Referring again to FIGS. 1 and 2, electrical discharge is produced between the anode 1 and the hot cathode 2 to excite argon molecules in the laser tube. Laser oscillation and light amplification is achieved in the optical resonator composed of the semitransparent mirror 6a and the total reflection mirror 6b. A laser output is derived from the semitransparent mirror 6a. Thereupon, the laser tube 3 produces much heat owing to the electrical discharge, most part of which is freed from the heat radiating plate 4 to the outside and part of which is transmitted to the cathode bulb 5.

The prior art argon ion laser tube described above however has a drawback: there is produced temperature differences among the various portions on the cathode bulb 5 depending upon the amount of heat transmitted to the cathode bulb 5 and upon air flows directed from an air cooling fan mounted on the laser oscillator to cause misalignment of the total reflection mirror 6b supported on the cathode bulb 5. In particular, upon excitation of the argon ion laser tube from its cooled state misalignment of the mirrors is very severe because of temperature distribution upon operation being quite different from that upon the non-operation, so that the output of the laser immediately after the initiation of the electrical discharge is started at a severely lower value than in the operation and gradually approaches the output at the operation.

SUMMARY OF THE INVENTION

In view of the drawback with the prior art, it is an object of the present invention to provide an air-cooled argon ion laser tube capable of preventing the misalignment of the mirrors by compensating thermal expansion differences due to temperature differences among portions on the cathode bulb.

In accordance with the argon ion laser tube of the present invention, metal or ceramic with different thermal expansion coefficient from that of the cathode bulb is joined with the cathode bulb for supporting the one mirror constituting the optical resonator in a direction where the cathode bulb has its temperature differences, e.g., on the upper or lower side of the cathode bulb provided it has temperature differences vertically.

DETAILED DESCRIPTION OF THE PREFERRED EMBODIMENT

The present invention will now be described with reference to the accompanying drawings.

Figure 1:
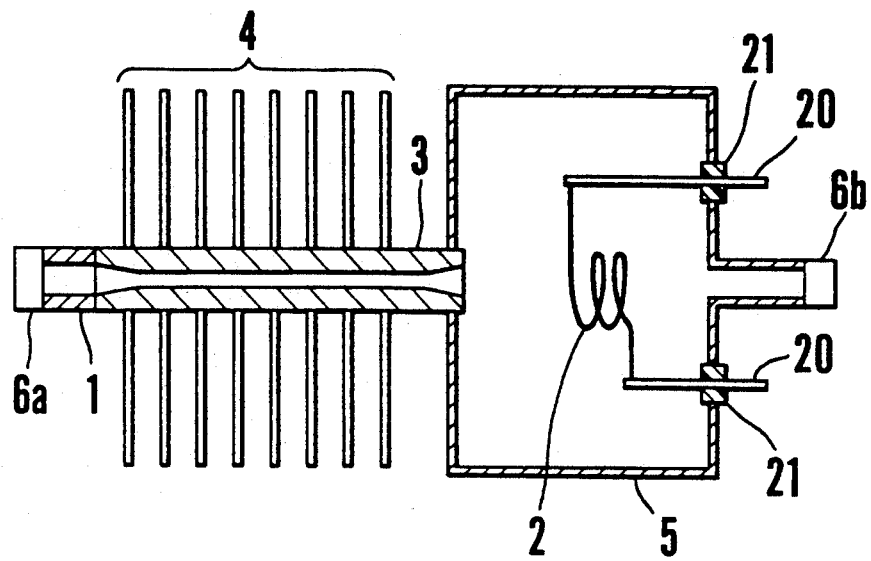
FIG. 1 is a cross-sectional view exemplarily illustrating a prior art argon ion laser tube.
Figure 2:
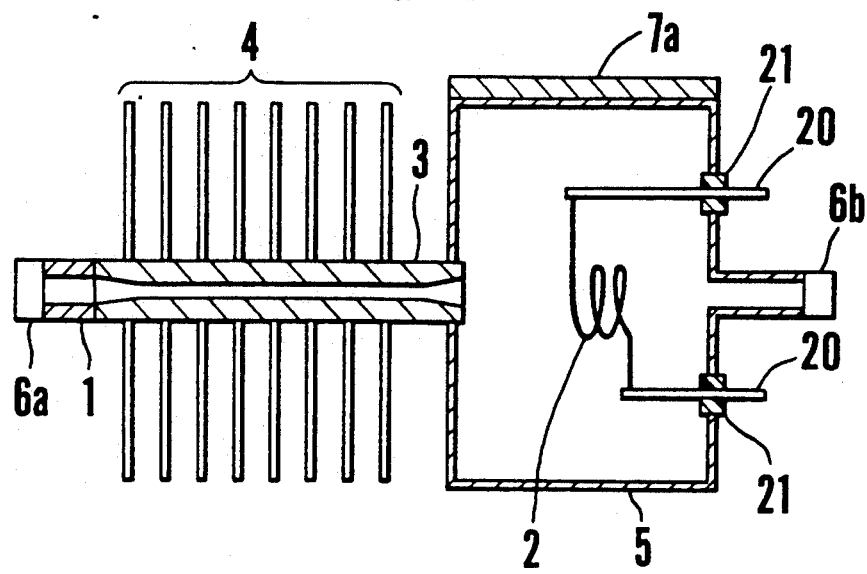
FIG. 2 is a cross-sectional view illustrating an embodiment of an argon ion laser tube according to the present invention.
Figure 3:
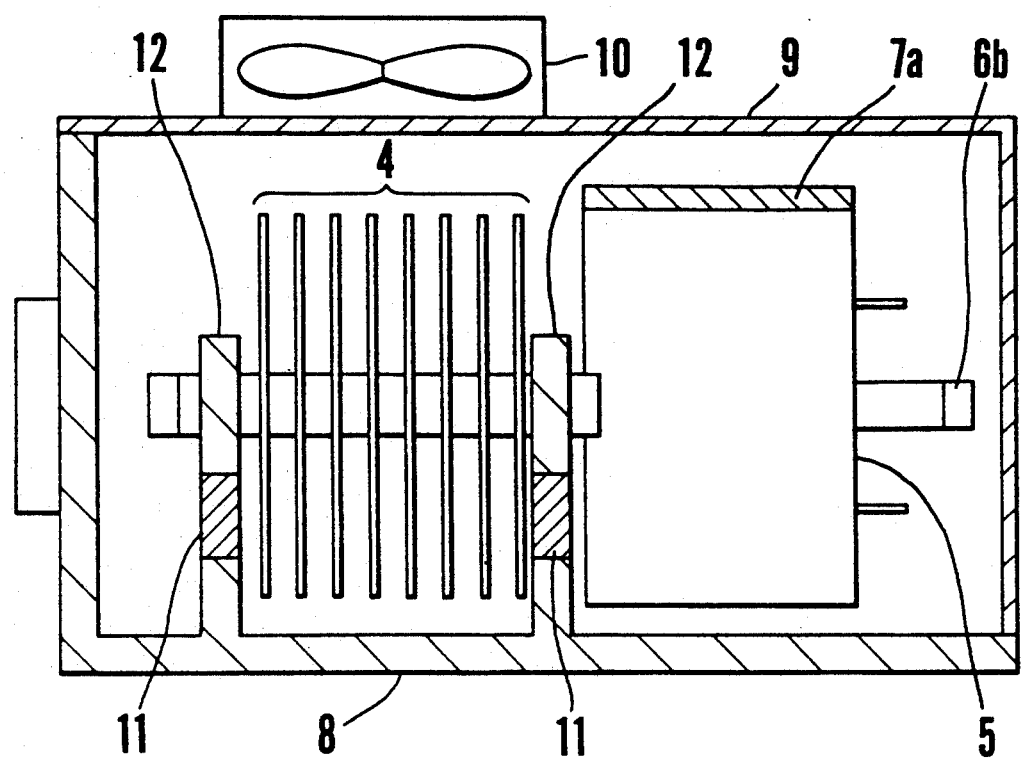
FIG. 3 is a side view illustrating the interior of the argon ion laser tube of the present invention as it is mounted on a laser oscillator.

Referring to FIG. 2, a preferred embodiment of the air-cooled argon ion laser tube of the present invention is illustrated in a cross-sectional view. As illustrated in the figure, argon gas as a medium encapsulated in a laser tube is electrically discharged between an anode 1 and a filament type hot cathode 2, and current density along an elongated electrical discharge path in a laser tube 3 is increased for excitation for laser oscillation. The laser tube 3 includes the narrowed electrical discharge path and hence has higher electric impedance therealong, permitting almost all electrical discharge energy to be wasted along that part as heat. The heat is transmitted to a plurality of heat radiating plates 4 and radiated to the air. A cathode bulb 5 is adapted to support the hot cathode 2 and one 6b of a pair of mirrors 6a, 6b which constitute an optical resonator.

Figure 4:
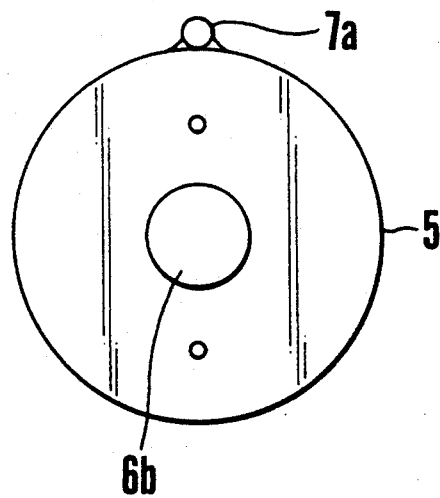
FIG. 4 is a side rear view illustrating the argon ion laser tube of FIG. 2 when viewed from the cathode bulb.

The laser tube is held by a holder part 12 of a base plate 8 through an insulator 11 as part of the laser oscillator, and part of the heat radiating plates 4 is particularly forcedly air-cooled by an air-cooling fan 10 mounted on a cover 9. An air flow formed by the fan 10 is formed also interiorly of the laser resonator or around the cathode bulb 5 additionally to the part of the heat radiating plate 4. Owing to the air flow there is produced a temperature difference vertically of the cathode bulb 5. An actual measurement indicates that the cathode bulb 5 has lower temperature at the upper side thereof than at the lower side thereof. For compensating a difference between upper and lower thermal expansions due to the afore-mentioned temperature difference, in the present embodiment a rod-shaped member 7a of a higher thermal expansion coefficient than that of the cathode bulb 5 is joined with the upper side of the cathode bulb 5 by welding and so on, as illustrated in FIG. 4.

Hereby, the lower side elongation of the cathode bulb 5 is compensated with the elongation of the thermal expansion compensating member 7a joined with the upper side of the cathode bulb 5, and hence the mirror 6b supported by the cathode bulb 5 can be prevented from being misaligned.

Figure 5:
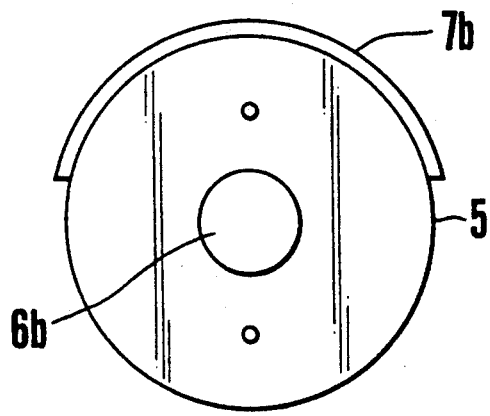
FIG. 5 is a side rear view illustrating another embodiment of the argon ion laser tube of the present invention when viewed from the cathode bulb.

Referring to FIG. 5, a second embodiment of the present invention is illustrated, in which a plate-shaped member 7b configured conformably to the outer shape of the cathode bulb 5 is joined with the cathode bulb 5 so as to completely cover substantially the upper half of the cathode bulb 5, instead of the thermal expansion compensating member of the cathode bulb 5 in the first embodiment, exhibiting the identical effect as the first embodiment.

Although in the above embodiments the temperature difference is produced vertically of the cathode bulb 5 in view of the mounting position of the air-cooling fan 10, there is another situation where there are varied portions, where temperature differences are produced, owing to the affection of the mounting position of the resonator. It is necessary in that situation to mount a thermal expansion compensating member so as to compensate thermal expansion differences due to the temperature differences.

In accordance with the present invention, as described above, different constituent parts in thermal expansion are mounted on the cathode bulb to prevent a thermal expansion difference from being produced owing to thermal imbalance of the cathode bulb and hereby prevent the mirrors supported by the cathode bulb from being misaligned. There can accordingly be reduced variations of mirror alignment until the laser tube is thermally stabilized after switched from its off state. It is thus possible to improve the building-up characteristic of a laser output as well as prevent the optical axis of laser light outputted from the semitransparent mirror from being displaced.

What is claimed is:

1. An air-cooled argon ion laser tube comprising:
   a laser tube for excitation for laser oscillation;
   a plurality of heat radiating plates each mounted on the outside of the laser tube;
   a metallic cathode bulb connected to one end of the laser tube;
   an anode disposed in the vicinity of the other end of the laser tube;
   a filament type hot cathode disposed in the cathode bulb;
   a semitransparent mirror disposed on the other end of the laser tube;
   a total reflection mirror disposed at a location on said cathode bulb opposite to the one end of the laser tube;
   said semitransparent mirror and said total reflection mirror constituting an optical resonator; and
   a thermal expansion compensating member having a thermal expansion coefficient different to that of the cathode bulb on said cathode bulb for compensating a temperature difference between any portions on said cathode bulb.

2. An air-cooled argon ion laser tube according to claim 1 wherein the thermal expansion compensating member having a thermal expansion coefficient greater than that of the cathode bulb is mounted on a lower temperature portion of said cathode bulb.

3. An air-cooled argon ion laser tube according to claim 1 wherein said thermal expansion compensating member is a rod-shaped member extending axially of the laser tube.

4. An air-cooled argon ion laser tube according to claim 1 wherein said thermal expansion compensating member is a plate-shaped member covering therewith part of the cathode bulb.

5. An air-cooled argon ion laser tube according to claim 1 wherein said thermal expansion compensating member comprises a metal material.

6. An air-cooled argon ion laser tube according to claim 1 wherein said thermal expansion compensating member comprises ceramic.

* * * * *